Dec. 31, 1957 R. L. SINK ET AL 2,818,557
DIGITIZER
Filed Oct. 14, 1955 3 Sheets-Sheet 1

ROBERT L. SINK
ARVO A. LAHTI
DUNCAN N. MACDONALD
MILTON L. PATRICK
INVENTORS

BY

Christie, Parker & Hale
ATTORNEYS

Dec. 31, 1957     R. L. SINK ET AL     2,818,557
DIGITIZER

Filed Oct. 14, 1955     3 Sheets-Sheet 2

ROBERT L. SINK
ARVO A. LAHTI
DUNCAN N. MAC DONALD
MILTON L. PATRICK
INVENTORS.

BY

Christie, Parker & Hale
ATTORNEYS

Dec. 31, 1957  R. L. SINK ET AL  2,818,557
DIGITIZER
Filed Oct. 14, 1955  3 Sheets-Sheet 3

ROBERT L. SINK
ARVO A. LAHTI
DUNCAN N. MAC DONALD
MILTON L. PATRICK
INVENTORS.

BY
Christie, Parker & Hale
ATTORNEYS

United States Patent Office 2,818,557
Patented Dec. 31, 1957

2,818,557

DIGITIZER

Robert L. Sink, Altadena, Calif., Arvo A. Lahti, Scottsdale, Ariz., and Duncan N. MacDonald, Arcadia, and Milton L. Patrick, Anaheim, Calif., assignors, by mesne assignments, to Consolidated Electrodynamics Corporation, Pasadena, Calif., a corporation of California Application October 14, 1955, Serial No. 540,520

3 Claims. (Cl. 340—347)

This invention relates to the field of analog-to-digital conversion and has particular reference to shaft position digitizers.

In many instances it is desirable to provide a digital representation of an analog function appearing as rotation of a shaft. For example, the varying rotational position of the spindle or shaft of a self-balancing potentiometer furnishes an analog function which may be digitized to represent the readings of the potentiometer; also, the rotational position generated by a constant speed electric motor provides a constant analog function which may be digitized to represent time.

The digitizer of the present invention provides convenient and simplified apparatus which is relatively inexpensive and which provides a continuous unambiguous readout. The digitizer of the invention produces electric contact closures representative of the digital value of the rotational position of a shaft, and the contact closures may be employed to actuate any suitable readout device. For example, the contact closures may be employed to actuate a visible number display, an electric typewriter, a computer, or a tape or card perforating apparatus.

In accordance with the present invention, a plurality of commutators and brushes are employed together with means responsive to the rotation of a shaft for producing relative motion between the brushes and commutators. Each commutator has a plurality of readout segments and it also has a plurality of gating segments. A gating brush and a pair of readout brushes are provided for each commutator, with one readout brush of each pair leading the other in contact action along the readout segments of the commutator. In response to the action of the respective gating brushes, the individual pairs of trailing and leading readout brushes are alternately connected to the output circuit of the digitizer so as to provide contact closures representative of digital values in accordance with the rotational position of the shaft. The digitizer is arranged so that higher order commutator readouts transfer from the trailing to the leading readout brushes at the instant when a lower order gating brush reaches a carry-over level on its commutator, so that the action of the higher order readouts is precisely synchronized with the action of a lower order readout.

The digitizer provides a continuous and unambiguous digital readout without requiring a complicated translating network, and the precision required in fabricating the digitizer is substantially less than ordinarily required for instruments of this type.

The mechanical arrangement of the digitizer is considered an important aspect of the invention. Accordingly, in its preferred embodiment the digitizer of the present invention includes a support frame, a pair of commutator plates, and pivotal connection means coupling one end of the respective commutator plates to the frame. A plurality of commutator patterns are fixed on the commutator plates, and a brush carrier is included for each commutator pattern with a plurality of brushes being connected to each brush carrier, and with means for rotatably mounting the brush carriers with respect to the respective commutator patterns. Means is provided for rotating the respective brush carriers in accordance with the rotary movement of the input shaft, and means are coupled to the swinging end of each commutator plate for engaging and disengaging the brushes with the commutator patterns by pivoting the commutator plates about their pivotal connection to the frame.

The invention is explained in detail with reference to the drawings, in which.

Figures 1, 2:
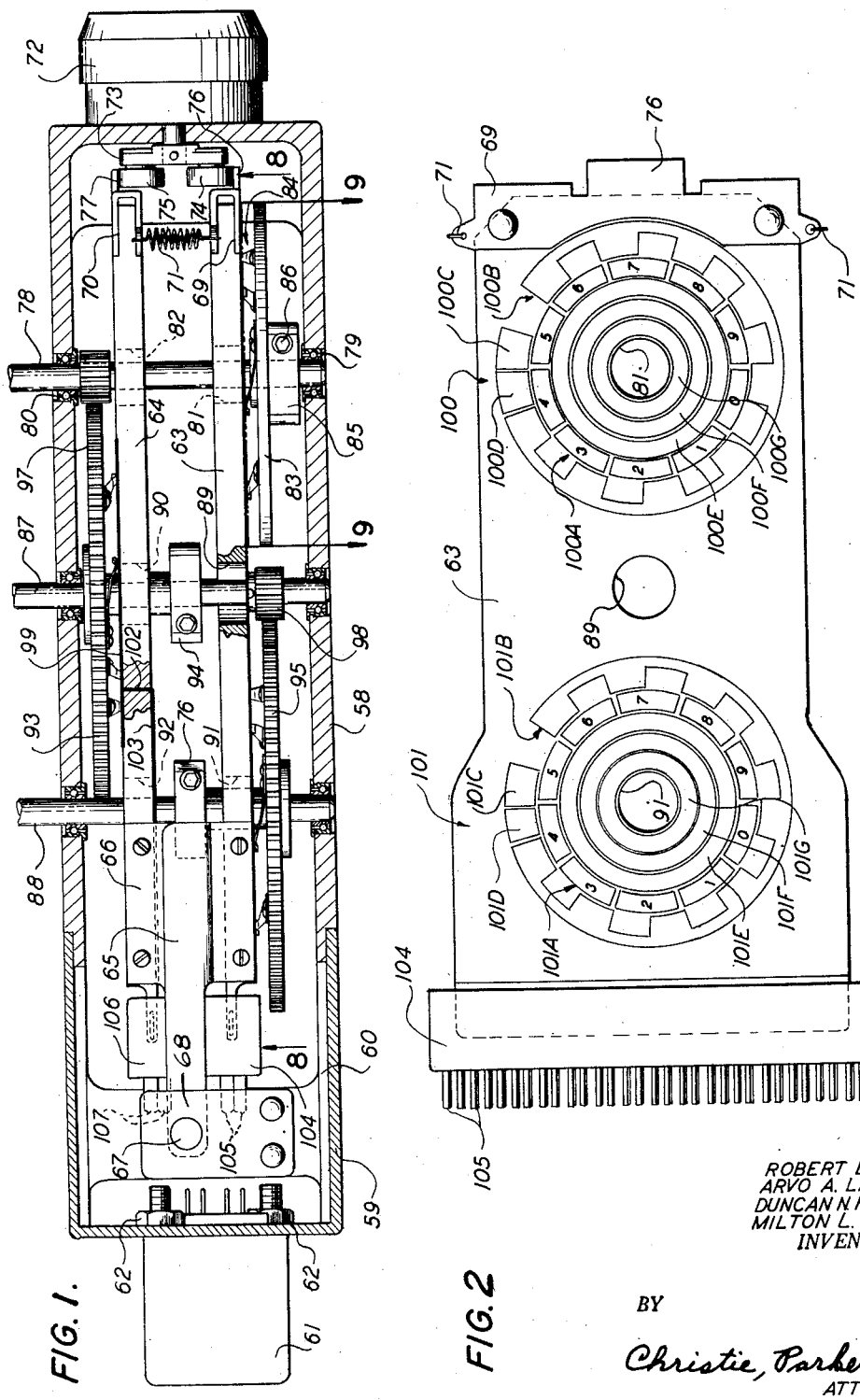
Fig. 1 is a top view, partially in section, of a preferred embodiment of the digitizer as a general shaft position analog-to-digital converter.
Fig. 2 is an elevation view of the face of a commutator plate taken along line 2—2 of Fig. 1.

Referring to Fig. 1, the general digitizer includes an elongated rectangular housing or support frame 58 having a lid 59, most of which is cut away in the view of Fig. 1. The lid is hinged to one end of the housing, and the housing is cut off in a slanting direction at its opposite end as shown at 60 to make room for relays, such as relay 61 which is attached through the end of the lid and secured by a plurality of nuts 62. With this arrangement, most of the electrical parts such as relays, diodes, switches and wiring may be affixed to the lid leaving the mechanical parts connected to the housing so that easy access is had to both electrical and mechanical components by opening the lid.

A first commutator plate 63 and a second commutator plate 64 are positioned apart and parallel to one another in the housing. A pair of pivot plates 65, 66 are connected respectively between the top portion of one end of each commutator plate and a common pivot pin 67, the pivot pin being fixed to the housing by a structural assembly 68. The same kind of connection between the pivot pin and the commutator plates is made to the bottom portion of the same end of the commutator plates by a second pair of pivot plates which are hidden in the view of Fig. 1, thereby completing the pivot connection between the housing and the end of the commutator plates.

A pair of brackets 69, 70 are respectively connected to the swinging or free ends of the commutator plates. A pair of coil springs 71 are connected between the brackets, thereby urging the plates to pivot toward one another. A rotary solenoid 72 is connected through the end of the housing and it may be actuated by electrical means to pivot the commutator plates against the action of the pair of springs 71. This pivot action is accomplished by means of an arm 73 of the solenoid which carries a pair of rollers 74, 75 for engaging the inside surface of a protruding portion of each bracket, said protruding portions being shown at 76 and 77 for the brackets 69, 70 respectively.

A units shaft 78 is rotatably mounted transversely of the housing in bearings 79, 80, the shaft extending through accommodating openings 81, 82 in the respective commutator plates 63, 64. A units brush carrier 83 which carries a plurality of brushes 84 is fixed coaxially on the units shaft by a collar member 85 so that the brushes on the brush carrier may contact the outer face of the first commutator plate 63. The collar member may be loosened by means of a screw 86 so that the angular position of the brush carrier with respect to the shaft may be adjusted.

Likewise, a tens shaft 87 and a hundreds shaft 88 are rotatably mounted transversely of the housing at positions apart from and parallel to the units shaft, the tens shaft extending through accommodating openings 89, 90 in the respective commutator plates 63, 64, and the hundreds shaft extending through accomodating openings 91, 92 in the respective commutator plates 63, 64. A tens brush carrier 93 is fixed on the tens shaft by means of a collar member 94 so that the brushes on the carrier may contact the outer face of the second commutator plate 64. A hundreds brush carrier 95 is fixed on the hundreds shaft by a collar member 96 so that its brushes may contact the outer face of the first commuator plates 63.

The units shaft is coupled to the tens shaft in 1 to 10 gear ratio as shown at 97, and the tens shaft is coupled to the hundreds shaft in 1 to 10 gear ratio as shown at 98. Thus, one revolution of the units shaft produces $1/10$ revolution of the tens shaft and $1/100$ revolution of the hundreds shaft thereby providing a decade action in which the respective brush carriers are rotated in inverse accordance with respect to the numerical order of magnitude represented by each commutator.

A tens commutator 99 is disposed opposite the tens brush carrier on the outside face of the second commutator plate 64. Similarly, a units commutator 100 and a hundreds commutator 101 are disposed opposite the units brush carrier and the hundreds brush carrier respectively on the outside face of the first commutator plate (see Fig. 2). The units, tens and hundreds commutator patterns are identical.

When the rotary solenoid 72 is actuated, the commutator plates pivot outwardly causing the commutators and the brushes on the respective brush carriers to come into contact. The brushes serve to short various conductive segments of each commutator pattern together as the brush carriers rotate. The electrical circuitry includes "feedthru" connections which extend from electrically independent segments of each commutator through the commutator plate and connect to conductive paths printed on the inside face of the commutator plate. Such a feedthru" connection is illustrated at 102, and such a conductive path is illustrated at 103 in Fig. 1.

The conductive paths extend to the pivoted end of the commutator plate where they contact the respective terminals of a plug. As shown, a plug 106 having a plurality of terminals 107 is connected to the pivoted end of the second commutator plate 64.

Figure 4:
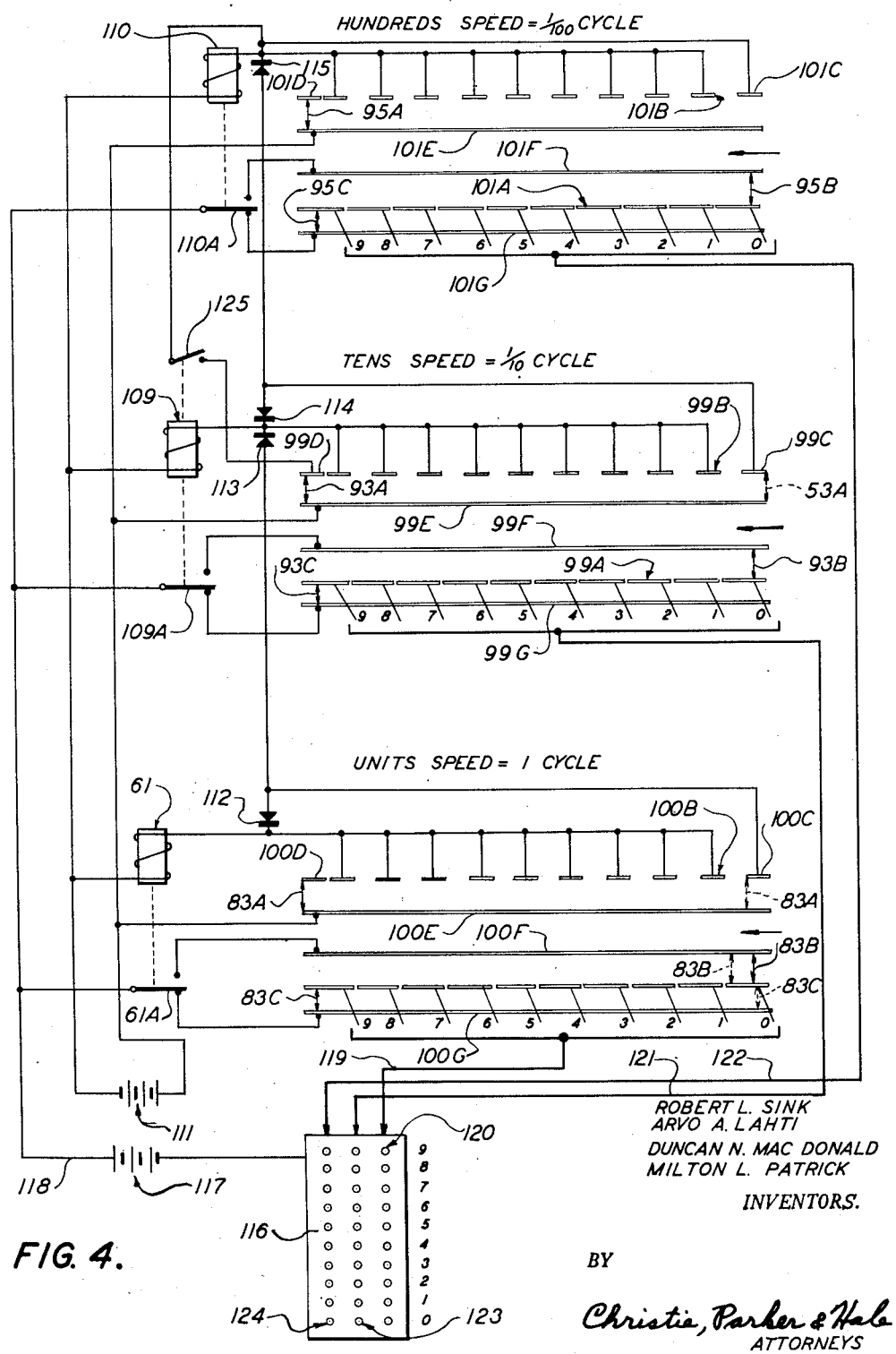
Fig. 4 is a schematic diagram of the electrical circuitry of the apparatus of Fig. 1.

Referring to Figs. 2 and 4, the respective commutators 100, 99, 101 have a plurality of readout segments 100A, 99A, 101A, the readout segments being of substantially the same size and spacing. Each commutator also has a plurality of connected gating segments 100B, 99B, 101B, a separate carry-over gating segment 100C, 99C, 101C, and a transfer gating segment 100D, 99D, 101D respectively. Further, each commutator is provided with three concentric slip rings 100E, 100F, 100G; 99E, 99F, 99G; and 101E, 101F, 101G.

Figure 3:
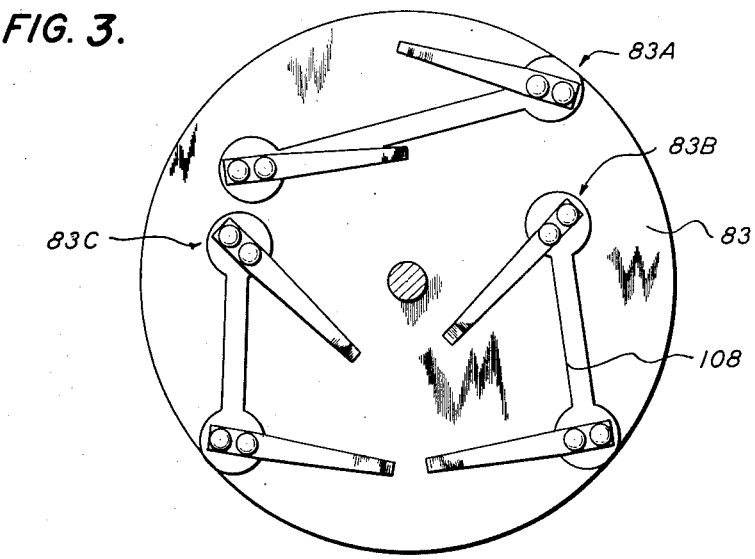
Fig. 3 is an elevation view of the face of a brush carrier taken along line 3—3 of Fig. 1.

Each brush carrier is provided with six brushes arranged to short the commutator segments to the slip rings as the carrier moves the brushes in contact action around the associated commutator. Referring to Figs. 1, 3 and 4, the brush carriers 83, 93, 95 each have a pair of gating brushes 83A, 93A, 95A for shorting the transfer, carry-over, and gating segments of the associated commutator to one slip ring of the commutator, a pair of leading readout brushes 83B, 93B, 95B for shorting readout segments to another of the slip rings, and a pair of trailing readout brushes 83C, 93C, 95C for shorting readout segments to the remaining slip ring. The brushes of each pair are electrically connected by a conductive path printed on the face of the associated brush carrier as shown at 108 in Fig. 3.

The functional alignment of brushes and segments is shown in Fig. 4, where commutator patterns are laid out linearly with the brushes traveling from right to left as indicated by the arrows.

The gating brushes are staggered so that the lower order gating brushes progressively lead the higher order gating brushes in contact action going from the lowest to the highest order commutator, and the separation between leading and trailing readout brushes on each commutator is less than the length of a readout segment and greater than the space between readout segments. As will become clear later in the description, the units gating brushes 83A lead the tens gating brushes 93A by less than $1/10$ the length of a gating segment, and likewise the tens gating brushes 93A lead the hundreds gating brushes 95A by less than $1/10$ the length of a gating segment. The distance between gating segments is equal to the length of a gating segment, and the distance between readout segments is merely any small distance sufficient to prevent shorting between segments as the brushes pass over them. The distance between the trailing edge of the transfer segments and the leading edge of the carry-over gating segments is small enough to allow the gating brushes to short these segments together when passing over them.

Three relays 61, 109, 110 are associated with the three commutators. The armatures 61A, 109A and 110A serve to transfer the readout from the trailing to the leading readout brushes of the respective commutators each time that the respective relays are energized. A source of potential 111 provides current for energizing the relays.

Four interconnected diodes 112, 113, 114, 115 are coupled between the commutators and the relay windings for channeling electrical signals from the respective carry-over segments to the windings of higher order relays, thereby allowing the lower order gating brushes to control the transfer from trailing to leading readout brushes on the higher order commutators. The diodes allow feed forward from lower to higher orders, but prevent feed back from higher to lower orders.

The individual readout segments of the various commutators may be connected to correspondingly valued lights in a visible number display 116, with a power source 117 and a return lead 118 completing the circuit for visual readout in accordance with the contact closures made between the readout brushes and segments. Ganged output leads 119 connect individual readout segments of the units commutator to individual lights in a units column of lights 120 of the visible number display. Likewise output leads 121, 122 couple the tens and hundreds readout segments to tens and hundreds columns of lights 123, 124 of the visible number display. There are ten lights in each column, the individual lights having digital significance in accordance with the numbers 0 to 9 as shown.

At the instant shown by the solid line brushes in Fig. 4, the contact closures represent the digits 9, 9, 9. All of the relays are de-energized, and the trailing readout brushes 83C, 93C, 95C are being read out.

The gating brush 83A on the units commutator is almost at a numerical carry-over level, i. e., almost in position to contact the carry-over gating segment 100C. When contact is made, the readout of 9, 9, 9, must change to 0, 0, 0. For this to occur, all three relays 61, 109, 110 must be energized so that the readout will change from the trailing to the leading readout brushes at each commutator.

When the brush 83A contacts the carry-over segment 100C, the units relay 61 is energized through the diode 112 and the tens relay 109 is energized through the diode 113. The diode 114 blocks further travel of this signal. As soon as the tens relay 109 is energized, it actuates an armature 125 which closes a circuit between the tens transfer segment 99D and the hundreds relay 110, thereby energizing the hundreds relay through the tens gating brush 93A.

Thus, the readout at each commutator is transferred from the trailing to the leading readout brushes, and the transfer is effected at substantially the same instant because the transfer at higher levels is controlled by the action of a lower order gating brush.

At the instant the units gating brush 83A breaks contact with the carry-over gating segment 100C, as represented by the dotted line positions of the brushes, the units relay 61 is de-energized causing the armature 61A to shift the readout from the leading to the trailing units readout brush which, by this time, is in contact with the "0" readout segment. Thus, the units readout remains at "0."

While the units gating brush is traversing the carry-over segment, the tens gating brush 93A must make contact with the tens carry-over segment 99C so that the tens relay 109 and the hundreds relay 110 remain energized through diodes 114, 115 respectively after the units gating brush leaves the carry-over segment 100C, thereby maintaining the tens and hundreds readouts both at "0" through their respective leading readout brushes. To meet this condition, the separation between the tens transfer segment 99D and the tens carry-over segment 99C must be small enough so that the tens gating brush shorts across these segments during its movement and thereby allows no interval of time between leaving the transfer segment 99D and contacting the carry-over segment 99C during which the hundreds relay 110 might become de-energized. Further, since the tens gating brush only moves $\frac{1}{200}$ cycle while the units gating brush moves across the units carry-over segment ($\frac{1}{20}$ cycle), the tens gating brush must trail the units gating brush by a distance less than $\frac{1}{10}$ the length of a gating segment ($\frac{1}{200}$ cycle) at the instant when the units gating brush leaves the transfer segment 100D in order for the tens gating brush to contact the tens carry-over segment 99C before the units gating brush leaves the units carry-over segment 100C.

A similar analysis applies between the tens and hundreds gating brushes. Thus, before the tens gating brush breaks contact with the tens carry-over segment 99C, the hundreds gating brush 95A must contact the hundreds carry-over segment 101C to retain the hundreds relay 110 in the energized state and the hundreds readout at "0." This condition is met by the hundreds gating brush lagging the tens gating brush by a distance less than $\frac{1}{10}$ the length of a gating segment at the instant the tens gating brush leaves the transfer segment 99D.

It will be apparent to those skilled in the art that the number of commutators may be extended. Thus, a thousands commutator may be provided. If this were done, the hundreds commutator would have its carry-over segment 101C and its transfer segment 101D connected to the thousands commutator in a manner identical to that in which the tens commutator is coupled to the hundreds commutator.

It should be noted that the transfer gating segments have a position corresponding to a space between the other gating segments, and that transfer gating segments are not needed on the lowest and highest order commutators. However, it should be also noted that to include the transfer segments in all commutator patterns does no harm and makes all commutator patterns identical, which facilitates mass production in manufacturing.

As should be evident from the foregoing description, the dimensional tolerances in the commutator patterns are liberal except for the leading edges of gating segments and, since the units gating segments control the readout in the tens and hundreds commutators, only the leading edges of the units gating segments need be precisely located.

Any "analog" or input shaft whose rotational position is to be digitized may be coupled directly or indirectly to either the units shaft 78, the tens shaft 87, or the hundreds shaft 88. For example, a direct 1:1 coupling of an input shaft to the units shaft will cause the output of the digitizer to register in tenths, units, and tens of revolutions of the input shaft, i. e. where an output of 9, 9, 9, represents 99.9 revolutions.

The digital value in each decimal order is positively represented by an electrical signal at all times when the digitizer is in operation; that is, there is a continuous readout occurring substantially simultaneously with the input shaft's attaining different rotational positions. However, if discontinuous readout is desired, it is a simple matter to provide a conventional scanner circuit for scanning the values of the contact closures at pre-set intervals. Also, the digitizer counts both in the forward and backward directions, i. e. the readout will go from 0, 0, 0, to 9, 9, 9, or from 9, 9, 9, down to 0, 0, 0, in cycles depending upon the direction and amount of rotation of the input shaft.

Further, the output of the digitizer is always discrete and unambiguous. For example when the readout 329 changes to 330, the two changes to a three and the nine changes to a zero at substantially the same instant because the higher order transfer is controlled by the same means controlling the lower order transfer, the control being the lower order gating brush. Since machines like electric typewriters, computers and the like record what they see when they see it, a discrete continuous readout without ambiguity is extremely important.

To illustrate what is meant by "ambiguity," consider the transfer from the readout 399 to the readout 400. If the digits do not all change value at substantially the same instant, 399 may become any of 499, 409, 490, 309, 399, 390 before the complete transfer to 400 is effected. Mechanical tolerances for causing all brushes to contact appropriate commutator segments at substantially the same instant are prohibitive and impractical. Therefore, mnay modern digitizers resort to discontinuous readout to avoid this ambiguity, i. e. they provide no readout during the intervals of time in which ambiguity can occur. In the present invention as described, there is continuous readout and the number 399 will have no alternative but ot change to 400, if it changes at all.

For many present day uses the input shaft whose rotational position is to be digitized may be expected to rotate at a very high speed. To avoid excessive wear of brushes most of the better digitizers are provided with means for disengaging the brushes from the commutators during times when no readout is desired, thereby reducing brush and commutator wear considerably.

Conventional brush lifting mechanisms are troubled with several factors, among which are:

(1) They tend to complicate the commutator and brush arrangement;

(2) They tend to add excessive weight and bulk to the digitizer;

(3) They do not always accurately position the commutator with respect to the brushes, or vice versa; and (4) Eliminating the first three factors above by appropriate design overburdens the cost of the digitizer.

The mechanical design shown in Fig. 1 wherein commutator patterns are printed on plates having openings through which shafts extend, the plates being pivoted at one end, is offered as a unique and inexpensive solution to the factors above.

Within the scope of the invention, the commutators could be printed on what is now shown as the brush carriers and the brushes connected on what now is shown as the commutator plates. However, this structure is considered inferior because it would require means such as slip rings for making electrical connection to the segments of the commutators, such means being relatively expensive when compared to the ease of printing conductive paths on the inside faces of the commutator plates as shown at 103 in Fig. 1.

We claim:

1. Digitizer apparatus for providing electrical contact closures in accordance with the rotational position of an input shaft, comprising a support frame, a pair of commutator plates, pivot connection means coupling one end of the respective commutator plates to the frame, a plurality of commutator patterns affixed on the commutator plates, a brush carrier for each commutator pattern, a plurality of brushes for each brush carrier with said brushes connected to said brush carriers, means for rotatably mounting the brush carriers with respect to the commutator patterns, means for rotating the respective brush carriers in accordance with rotary movement of the input shaft, and means coupled to the swinging end of each commutator plate for engaging and disengaging the brushes with the commutator patterns by pivoting the commutator plates about their pivot connection to the frame.

2. Digitizer apparatus for providing electrical contact closures in accordance with the rotational position of an input shaft, comprising a housing, a pair of commutator plates disposed apart and approximately parallel in the housing, pivot connection means coupling one end of the respective commutator plates to the housing, a plurality of commutator patterns affixed on the commutator plates, a brush carrier for each commutator pattern, a plurality of brushes for each brush carrier with said brushes connected to said brush carriers, a plurality of shafts rotatably mounted to the housing, said shafts extending transversely through accommodating openings in the commutator plates and connecting to the respective brush carriers for rotatably mounting the brush carriers with respect to the commutator patterns, means responsive to rotary movement of the input shaft for rotating the brush carriers, and means coupled to the swinging end of the respective commutator plates and to the housing for engaging and disengaging the brushes with the commutator patterns by pivoting the commutator plates about their pivot connection to the housing.

3. Digitizer apparatus for providing electrical contact closures in accordance with the rotational position of a shaft, comprising a plurality of higher and lower order commutators, each commutator including a plurality of readout segments and a plurality of gating segments respectively arranged in concentric rings, a gating brush and a pair of readout brushes for each commutator, with one readout brush of each pair leading the other a predetermined distance along the ring of readout segments, means for providing relative motion between the brushes and the associated commutators in accordance with rotary movement of the shaft, means including a plurality of relays responsive to the action of the respective gating brushes for first connecting the trailing and then the leading readout brush of the respective commutators to the output circuit of the digitizer during predetermined increments of relative motion between the brushes and associated commutators, and means including a plurality of unidirectional conductors connected between the gating segments of lower order commutators and the relays controlling the readout brushes of the respective next higher order commutators for causing the leading readout brush of a higher order commutator to be connected to the output circuit of the digitizer at the instant when the lowest order gating brush reaches a carryover level on the gating segments of its commutator.

References Cited in the file of this patent

UNITED STATES PATENTS

| | | |
|---|---|---|
| 2,192,421 | Wallace | Mar. 5, 1940 |
| 2,666,912 | Gow | Jan. 19, 1954 |